No. 768,211. PATENTED AUG. 23, 1904.
P. BLAUBACH.
MACHINERY FOR MANUFACTURING PATTERNED LINOLEUM.
APPLICATION FILED APR. 1, 1902.
NO MODEL.
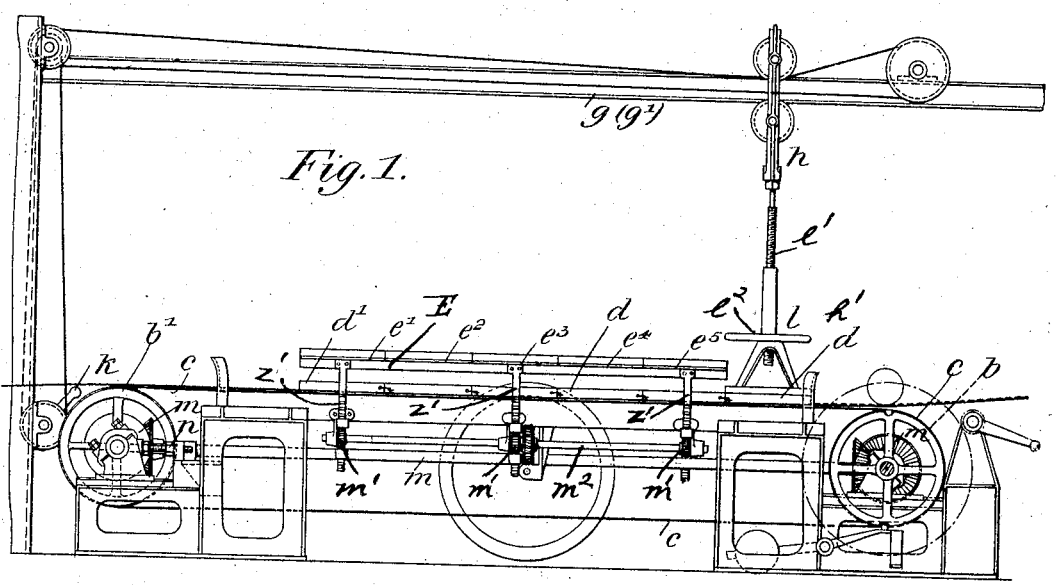
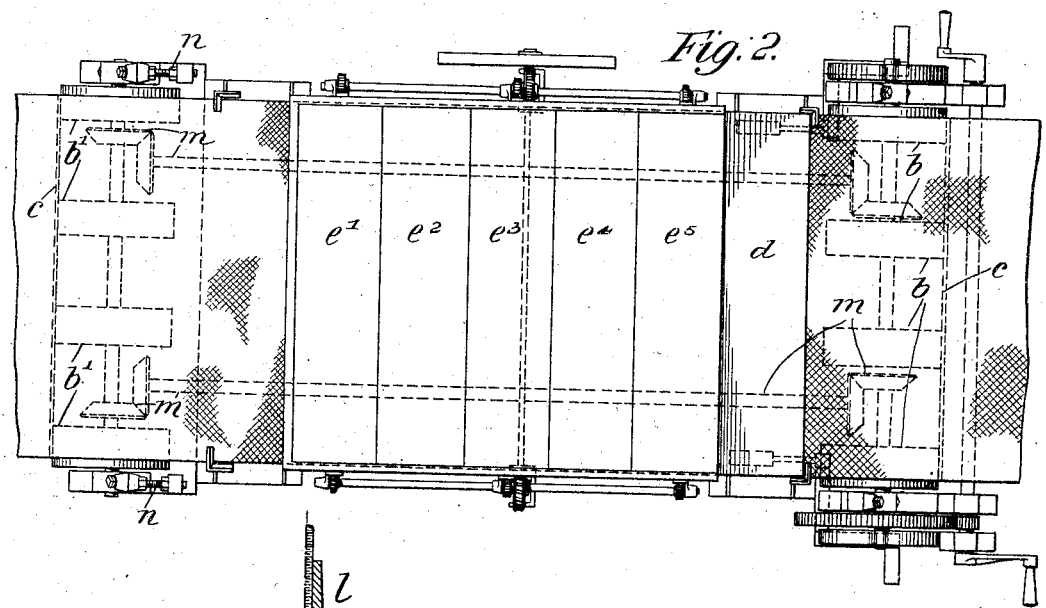
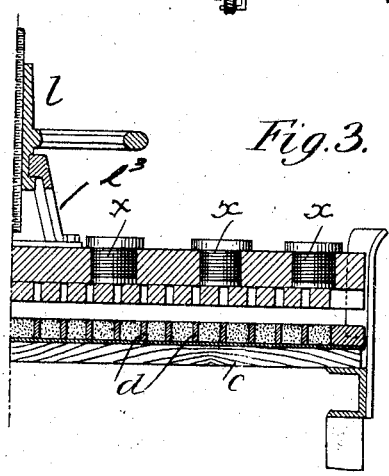
WITNESSES
INVENTOR
Paul Blaubach
BY
ATTORNEYS No. 768,211. Patented August 23, 1904.

UNITED STATES PATENT OFFICE.

PAUL BLAUBACH, OF BREMEN, GERMANY.

MACHINERY FOR MANUFACTURING PATTERNED LINOLEUM.

SPECIFICATION forming part of Letters Patent No. 768,211, dated August 23, 1904.

Application filed April 1, 1902. Serial No. 100,988. (No model.)

*To all whom it may concern:*

Be it known that I, PAUL BLAUBACH, residing at Bremen, in the Empire of Germany, have invented certain new and useful Improvements in Machinery for Manufacturing Patterned Linoleum; and I do hereby declare the following to be a full, clear, and exact description of the invention, such as will enable others skilled in the art to which it pertains to make and use it, reference being had to the accompanying drawings, which form part of this specification.

The present invention relates to a machine for manufacturing patterned linoleum.

The essential feature of the invention consists in the molds by means of which the colored composition is applied to the fabric, being arranged to travel through the machine and gradually be filled with all the colors of the pattern. Above the molds are located perforated plates or stencils capable of being moved up and down, each of which presents the contour of the pattern corresponding to one color. These stencils are raised for the purpose of allowing the molds to travel farther and after the molds have taken up their new position are again sunk. At the end of the machine the molds come under a press, the pressing-block of which profiles according to the pattern and is provided with electromagnets, uniformly or otherwise distributed. By means of the latter the mold-frame after the pressure has been imparted is raised from the fabric and by the aid of a suitable device conducted to the front of the machine, where it is set upon the table as first mold ready for being again advanced. This motion is effected by means of a movable table of wood or metal, above which the fabric for the composition, consisting of some light material—such as canvas, nettle-web, &c.—is stretched. Afterward this fabric is removed from the linoleum and the latter pressed upon a strong jute or like fabric. This permanent base or backing receives the linoleum, through which the jute travels also.

The invention is illustrated by the appended drawings, which show one construction of the machinery.

Figure 1 is an elevation of the machine. Fig. 2 is a plan view, partly in section, illustrating the arrangement of the stencil-plates and block. Fig. 3 is a detail view drawn to a larger scale and showing a vertical section of half of the press-block and coöperating parts.

Located above the table $c$ and moving with it is the fabric employed to receive the composition and afterward removed when the length of linoleum is formed. The table $c$ consists of an endless apron or traveling surface of slats, metal, or the like and passes over the rollers $b\ b'$, for the regular motion of which a spindle $m$ is provided, while it is stretched by a tension device $n$. Upon this endless apron, and particularly upon the fabric lying on it, the molds $d$, closely connected, are placed and travel with the fabric. They form to a certain extent a continuous series of molds, each of which is advanced in an endless course from the first position to the last and from here again to the first. Above the apron is located a frame E, carrying a plurality of stencils $e'$, $e^2$, $e^3$, $e^4$, and $e^5$, each of which is provided with an opening or perforation adapted to permit material of a certain color to be applied to one part of the mold and to cover the remaining portion. The openings in the succeeding stencils are so arranged that taken collectively they form the complete pattern. The frame E is raised and lowered by racks $z'$, operated by gears $m'$ on a shaft $m^2$. Above the table is arranged a traveler on rails $g\ g'$, whereby by means of hand-crank $k$ or the like a block $h$ can be traveled to and fro. The press—for example, a hand-press—$l$ is arranged below the block $h$, which can thus be depressed upon the composition. The press $l$ is of simple form, comprising simply a screw $l'$, having its upper end journaled in the block $h$. A hand-wheel $l^2$ has a threaded sleeve engaging the screw $l'$, and a swiveled frame $l^3$ on the lower side carries a plate X, in which are mounted a plurality of electromagnets $x$, which may be energized to cause the mold which has been pressed to adhere to the press-frame and be lifted therewith.

The length of linoleum is produced in the following manner: The composition, with the first color, is laid in the mold $d$ through the stencil $e'$, since the latter covers all those parts of the pattern of the mold which are not to receive this color. Hereupon the table-apron $a$, with the fabric, is so far advanced that the first mold comes to rest exactly under the second stencil and can receive the second color. After being filled the apron is again advanced through the length of a mold. When then the mold has received all the colors, it comes below the press $l$, and the loosely-lying composition is firmly pressed to a compact mass. The mold which has thus been standing below the press is now raised by the operation of the hand-wheel until it is clear of the stencils and the carriage $g$ moved back along rails until the mold is in initial position. The length of linoleum after being so pressed is subjected to the usual process and conducted to a press. Into the latter is fed the fabric which is to serve as permanent base or backing for the linoleum and is pressed upon the composition, which on leaving the press the temporary backing of canvas or the like is removed. Before commencing to move the table and the backing the stencils are elevated and on completion of motion again sunk upon the mold, for which purpose any suitable device may be employed. The molds may be conveniently elevated by means of electromagnets $x$, which effect uniform ascent and prevent warping or fracture.

Having thus described my invention, what I claim as new, and desire to secure by Letters Patent, is—

1. A machine for manufacturing patterned linoleum, comprising traveling molds corresponding in number to the number of colors contained in the pattern, and stencils above said molds, so constructed, that the parts of the pattern of the mold which are not to receive the particular color are covered over by the material of the stencil, substantially as described.

2. A machine for manufacturing patterned linoleum, comprising a table having a traveling motion molds advanced by said table corresponding in number to the number of colors contained in the pattern, and stencils above said molds, so constructed that the parts of the pattern of the mold which are not to receive the particular color are covered over by the material of the stencil, substantially as described.

3. A machine for manufacturing patterned linoleum, comprising a traveling table carrying the temporary base for the linoleum composition, molds advanced by said table corresponding in number to the number of colors contained in the pattern, stencils as specified above said molds, and means for pressing the linoleum composition after the application of the whole of the colors constituting the pattern, substantially as described.

4. A machine for manufacturing patterned linoleum, comprising a traveling table carrying the temporary base for the linoleum composition, molds advanced by said table corresponding in number to the number of colors contained in the pattern, stencils as specified above said molds, means for raising and lowering said stencils, and means for pressing the linoleum composition after the application of the colors constituting the pattern, substantially as described.

5. A machine for manufacturing patterned linoleum, comprising a traveling table carrying the temporary base for the linoleum composition, molds advanced by said table corresponding in number to the number of colors contained in the pattern, stencils as specified above said molds, means for raising and lowering said stencils, means for pressing the linoleum composition after the application of all the colors, and means for returning the molds to their initial position after the pressing operation, substantially as described.

6. In a machine for manufacturing patterned linoleum by means of molds, a press-block provided with electromagnets for the purpose of elevating the molds subsequent to the pressing operation, substantially as described.

In witness whereof I have hereunto signed my name, this 17th day of March, 1902, in the presence of two subscribing witnesses.

PAUL BLAUBACH.

Witnesses:
   FRIEDRICH HOYERMANN,
   FRANCIS A. BRYCE.